(12) United States Patent
Yoshida et al.

(10) Patent No.: US 11,794,442 B2
(45) Date of Patent: Oct. 24, 2023

(54) SUPERPOSITION INTERIOR COMPONENT

(71) Applicant: TOYODA IRON WORKS CO., LTD., Toyota (JP)

(72) Inventors: Kenichi Yoshida, Toyota (JP); Osamu Miyashita, Toyota (JP); Hideaki Sakai, Toyota (JP); Masamori Hirose, Toyota (JP); Kenji Onuma, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 94 days.

(21) Appl. No.: 17/598,898

(22) PCT Filed: Nov. 7, 2019

(86) PCT No.: PCT/JP2019/043666
§ 371 (c)(1),
(2) Date: Sep. 28, 2021

(87) PCT Pub. No.: WO2020/202626
PCT Pub. Date: Oct. 8, 2020

(65) Prior Publication Data
US 2022/0152972 A1     May 19, 2022

(30) Foreign Application Priority Data

Mar. 29, 2019 (JP) .................... 2019-065860

(51) Int. Cl.
*B32B 27/12* (2006.01)
*B32B 3/30* (2006.01)
(Continued)

(52) U.S. Cl.
CPC ............... *B32B 3/30* (2013.01); *B32B 3/266* (2013.01); *B32B 5/024* (2013.01); *B32B 7/022* (2019.01);
(Continued)

(58) Field of Classification Search
CPC ............ B32B 2250/03; B32B 2250/24; B32B 2605/08; B32B 27/08; B32B 27/12;
(Continued)

(56) References Cited

U.S. PATENT DOCUMENTS

| | | |
|---|---|---|
| 2015/0072105 A1 | 3/2015 | Miyashita et al. |
| 2016/0101743 A1 | 4/2016 | Miyashita et al. |
| 2017/0165939 A1 | 6/2017 | Miyashita et al. |

FOREIGN PATENT DOCUMENTS

| | | |
|---|---|---|
| JP | 2010143553 A | 7/2010 |
| WO | 2013-132677 A1 | 9/2013 |

OTHER PUBLICATIONS

Extended European Search Report dated Nov. 28, 2022 issued in European Application No. 19923441.0, 7pages.

*Primary Examiner* — Lawrence D Ferguson (57) ABSTRACT

A superposition interior component includes a base, an outer layer member, which covers the base, and a middle member, which is made of a soft plastic and disposed between the base and the outer layer member. The superposition interior component is formed by stacking the base, the middle member, and the outer layer member together. The middle member includes a plate-shaped body, first protrusions, and second protrusions. The first protrusions protrude from a first surface of the body, which faces the base. The second protrusions protrude from a second surface of the body, which faces the outer layer member.

7 Claims, 11 Drawing Sheets

(51) Int. Cl.
    *B32B 7/022*      (2019.01)
    *B32B 3/26*       (2006.01)
    *B32B 5/02*       (2006.01)
    *B32B 27/08*      (2006.01)
    *B32B 27/30*      (2006.01)
    *B32B 27/32*      (2006.01)
    *B32B 27/36*      (2006.01)
    *B60R 13/02*      (2006.01)

(52) U.S. Cl.
    CPC .............. *B32B 27/08* (2013.01); *B32B 27/12* (2013.01); *B32B 27/304* (2013.01); *B32B 27/32* (2013.01); *B32B 27/36* (2013.01); *B32B 2250/03* (2013.01); *B32B 2250/24* (2013.01); *B32B 2605/08* (2013.01); *B60R 13/02* (2013.01)

(58) Field of Classification Search
    CPC ....... B32B 27/304; B32B 27/32; B32B 27/36; B32B 3/266; B32B 3/30; B32B 5/024; B32B 7/022; B32B 2250/246; B32B 2250/40; B32B 2307/56; B32B 2605/003; B32B 3/06; B32B 3/085; B32B 7/05; B60R 13/02; B60R 2021/0414; B60R 21/04; A61K 47/65; A61K 47/6815; C07K 16/42; C07K 16/44; C07K 2317/76; C12N 9/0065; C12N 9/16; C12N 9/96; G01N 33/535
    See application file for complete search history.

SUPERPOSITION INTERIOR COMPONENT

TECHNICAL FIELD

The present invention relates to a superposition interior component.

BACKGROUND ART

Patent Document 1 discloses an interior component that includes a first member and a second member. The second member includes multiple tapered protrusions, which protrude toward the first member and can be deformed to bend.

When the second member is depressed toward the first member in this interior component, some or all of the protrusions are deformed to bend while being in contact with the first member. The interior component thus provides the user with a tactile impression similar to that of an interior component having a foamed material, such as urethane foam, embedded therein.

PRIOR ART DOCUMENT

Patent Document

Patent Document 1: International Publication No. 2013/132677

SUMMARY OF THE INVENTION

Problems that the Invention is to Solve

If the length of the protrusions is increased in order to increase the depressible amount of the second member, the following drawbacks may be caused. Since the protrusions are tapered, an increase in the length of the protrusions would increase the cross-sectional size of the proximal ends of the protrusions. Accordingly, the outermost portion of the second member has differences in thickness between sections in which the proximal portions of the protrusions are provided and the remaining sections. This increases the difference in the amounts of thermal shrinkage. As a result, molding defects due to thermal shrinkage, which are called sink marks, are likely to form in the outermost portion of the second member. This may degrade the aesthetic appeal.

To suppress the formation of sink marks, the thickness of the outermost portion may be increased. This, however, results in another drawback of a hard tactile impression when the second member is depressed.

The drawback related to sink marks is caused not only when tapered protrusions are formed, but also when protrusions having a constant cross-sectional size are used. Specifically, sink marks are formed when the constant cross-sectional size of the protrusions is increased in correspondence with an increase in their length for increasing the depressible amount of the second member.

Accordingly, it is an objective of the present invention to provide a superposition interior component that is capable of increasing a depressible amount and improving an aesthetic appeal at the same time.

Means for Solving the Problems

To achieve the foregoing objective, a superposition interior component is provided that includes a base, an outer layer member that covers the base, and a middle member made of a soft plastic. The middle member is disposed between the base and the outer layer member. The base, the middle member, and the outer layer member are stacked together to form the superposition interior component. The middle member includes a plate-shaped body, first protrusions, and second protrusions. The first protrusions protrude from a first surface of the body, and face the base. The second protrusions protrude from a second surface of the body, and face the outer layer member.

MODES FOR CARRYING OUT THE INVENTION

First Embodiment

A first embodiment will now be described with reference to FIGS. 1 to 3.

Figure 1:
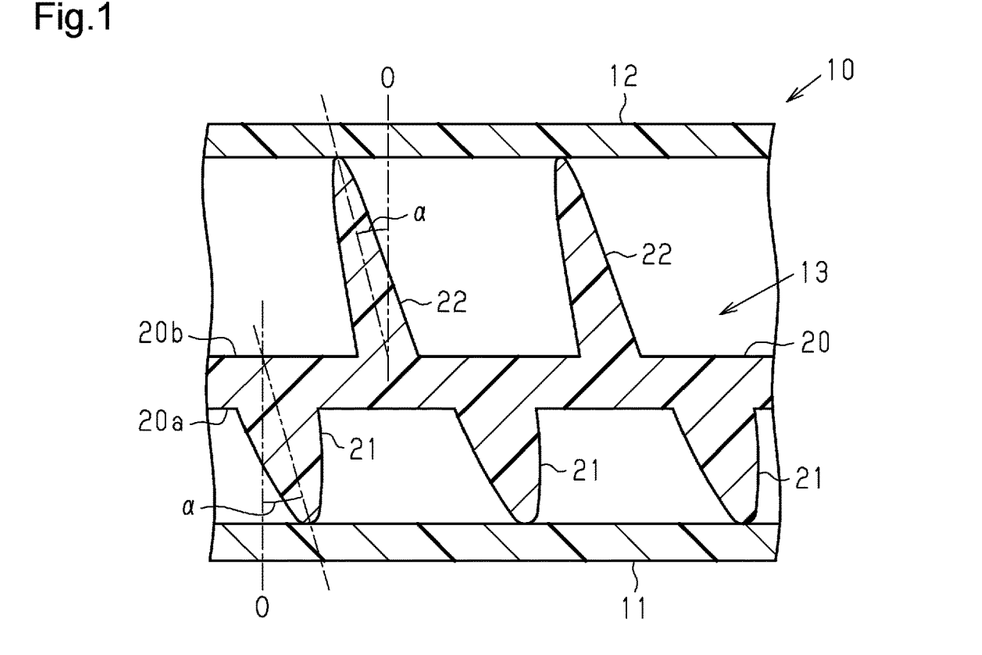
FIG. 1 is a cross-sectional view of a superposition interior component according to a first embodiment, schematically showing an interior component.

As shown in FIG. 1, a superposition interior component (hereinafter, referred to as an interior component 10), which is a door rim for an automobile, includes a base 11, an outer layer member 12, which is a thin plate covering the base 11, and a middle member 13, which is made of a soft plastic and disposed between the base 11 and the outer layer member 12. The base 11, the middle member 13, and the outer layer member 12 are stacked together to form the interior component 10.

The base 11 is made of a hard plastic such as polypropylene.

The outer layer member 12 is made of a soft plastic such as soft polyvinyl chloride.

The middle member 13 is made of a soft plastic such as soft polyvinyl chloride.

Figure 2:
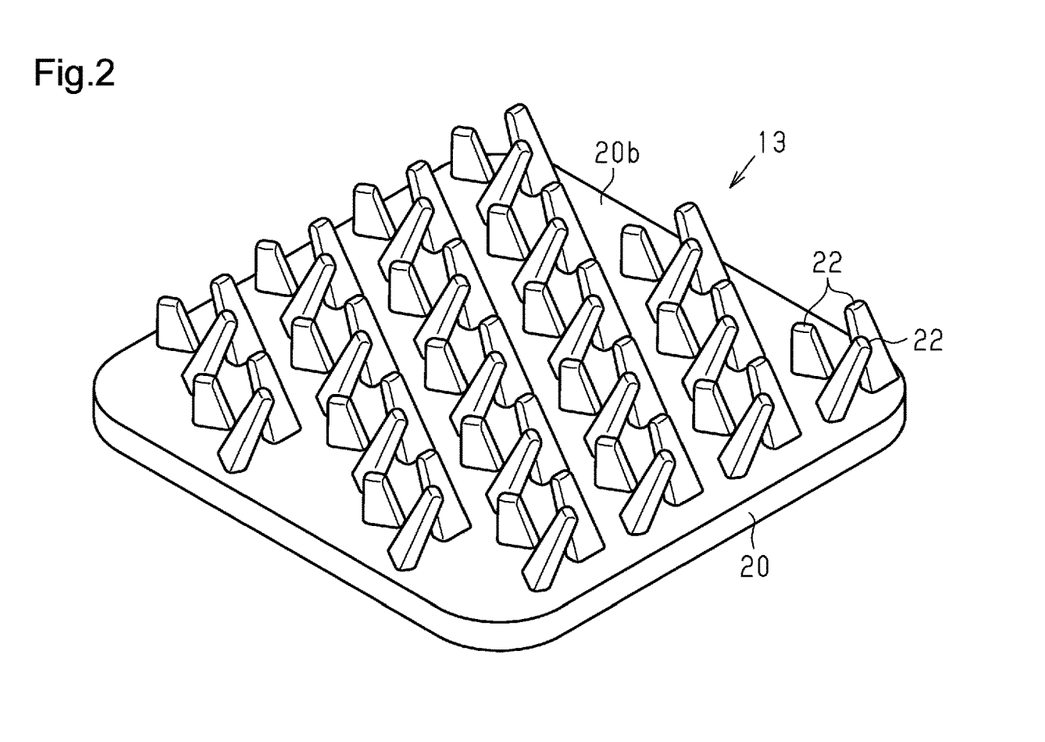
FIG. 2 is a perspective view showing a second surface of a middle member of the first embodiment.
Figure 3:
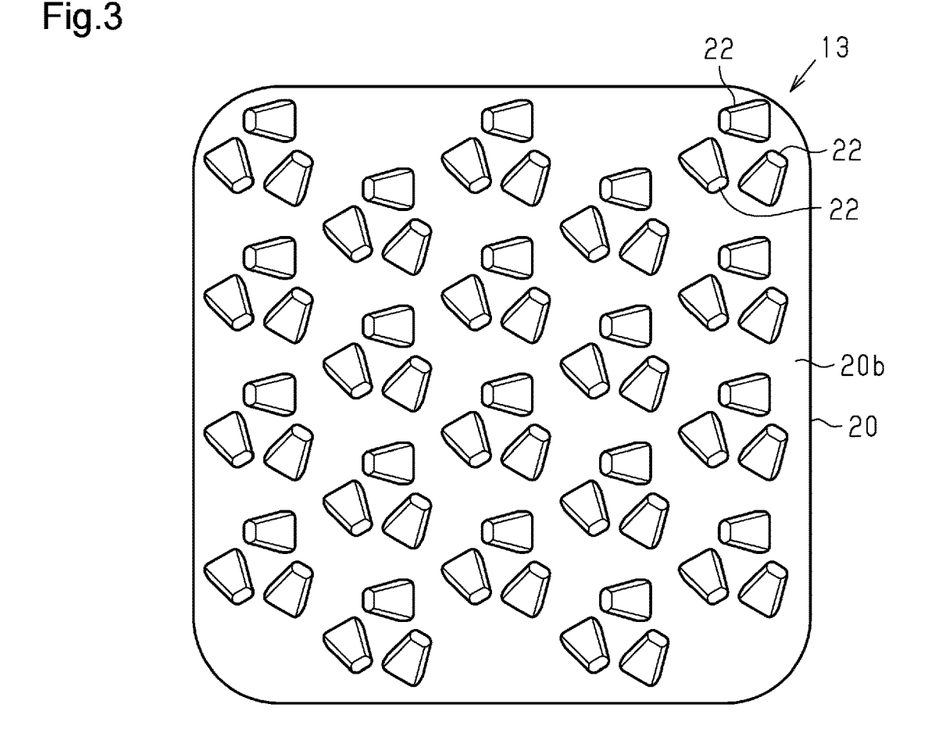
FIG. 3 is a plan view showing the second surface of the middle member of the first embodiment.

As shown in FIGS. 1, 2, and 3, the middle member 13 includes a plate-shaped body 20, tapered first protrusions 21, and tapered second protrusions 22, which are molded integrally. The first protrusions 21 protrude from a first surface 20a of the body 20, which faces the base 11. The second protrusions 22 protrude from a second surface 20b of the body 20, which faces the outer layer member 12. The body 20 of the present embodiment has a uniform thickness, so that the first surface 20a and the second surface 20b are parallel with each other.

As shown in FIG. 1, the first protrusions 21 are shorter and greater in the cross-sectional size than the second protrusions 22.

When no external force is acting on the outer layer member 12, the distal ends of the first protrusions 21 are in contact with the base 11. In this state, the distal ends of the second protrusions 22 are in contact with the outer layer member 12.

As shown in FIGS. 2 and 3, the second protrusions 22 are each a quadrangular pyramid with all corners rounded.

Although not illustrated, the first protrusions 21 are each a quadrangular pyramid with all corners rounded, like the second protrusions 22.

As shown in FIG. 1, the protruding direction of the first protrusions 21 and the second protrusions 22 are inclined in relation to the body 20.

That is, the protruding direction of the first protrusions 21 is inclined by a predetermined angle α in relation to a line O normal to the first surface 20a. Also, the protruding direction of the second protrusions 22 is inclined by the predetermined angle α in relation to a line O normal to the second surface 20b of the body 20.

As shown in FIGS. 2 and 3, the second protrusions 22 include sets of three second protrusions 22 located close to one another. The proximal portions of the three second protrusions 22 in each set are arranged at positions corresponding to the apexes of a regular triangle. These three second protrusions 22 project in different directions and are separated from one another.

Although not illustrated, the arrangement pattern of the first protrusions 21 is the same as the above-described arrangement pattern of the second protrusions 22.

The present embodiment has the following advantages.

(1) The superposition interior component 10 includes the base 11, the outer layer member 12, which covers the base 11, and the middle member 13, which is made of a soft plastic and disposed between the base 11 and the outer layer member 12. The superposition interior component 10 is formed by stacking the base 11, the middle member 13, and the outer layer member 12 together. The middle member 13 includes the plate-shaped body 20, the first protrusions 21, and the second protrusions 22. The first protrusions 21 protrude from the first surface 20a of the body 20, which faces the base 11. The second protrusions 22 protrude from the second surface 20b of the body 20, which faces the outer layer member 12.

With this configuration, when the outer layer member 12 is depressed toward the base 11, the second protrusions 22, which protrude from the body 20 of the middle member 13, are deformed to bend while being in contact with the outer layer member 12. At this time, the first protrusions 21, which protrude from the body 20, are deformed to bend while being in contact with the base 11. The interior component thus provides the user with a tactile impression similar to that of an interior component having a foamed material, such as urethane foam, embedded therein.

Also, since the outer layer member 12 does not need to include protrusions, it is possible to avoid drawbacks due to molding defects of the outer layer member 12 caused by molding protrusions.

Since the thickness of the outer layer member 12 can be reduced, it is possible to avoid a hard tactile impression when the outer layer member 12 is depressed.

Thus, the present embodiment increases the depressible amount and improves the aesthetic appeal of the superposition interior component 10.

(2) The protruding direction of the first protrusions 21 and the second protrusions 22 are inclined in relation to the body 20.

With this configuration, when the outer layer member 12 is depressed toward the base 11, the first protrusions 21 and the second protrusions 22 are deformed to bend easily. Accordingly, the present embodiment reliably provides the user with a tactile impression similar to that of an interior component having a foamed material, such as urethane foam, embedded therein.

(3) The body 20, the first protrusions 21, and the second protrusions 22 are molded integrally.

With this configuration, since the body 20, the first protrusions 21, and the second protrusions 22, which form the middle member 13, are molded integrally, the existence of the middle member 13 does not increase the number of components. This prevents the structure of the interior component 10 from being complicated.

(4) The middle member 13 is made of a soft plastic. This reduces the molding time as compared to a case in which a foamed material, such as urethane foam, is used.

Second Embodiment

A second embodiment will now be described with reference to FIG. 4. Differences from the first embodiment will mainly be discussed. Thus, the same or corresponding components as those in the first embodiment are given the same reference numerals, and detailed explanations are omitted.

Figure 4:
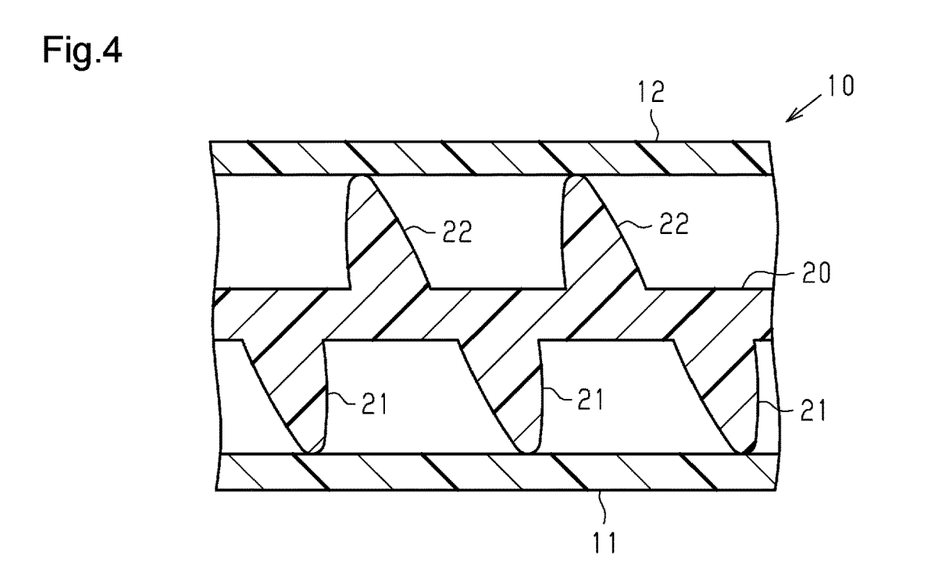
FIG. 4 is a cross-sectional view schematically showing a superposition interior component according to a second embodiment.

As shown in FIG. 4, first protrusions 21 and second protrusions 22 have the same length. The first protrusions 21 and the second protrusions 22 have the same cross-sectional size.

The superposition interior component 10 according to the above-described present embodiment has the advantages (1) to (4) of the first embodiment.

Third Embodiment

A third embodiment will now be described with reference to FIG. 5. Differences from the first embodiment will mainly be discussed. Thus, the same or corresponding components as those in the first embodiment are given the same reference numerals, and detailed explanations are omitted.

Figure 5:
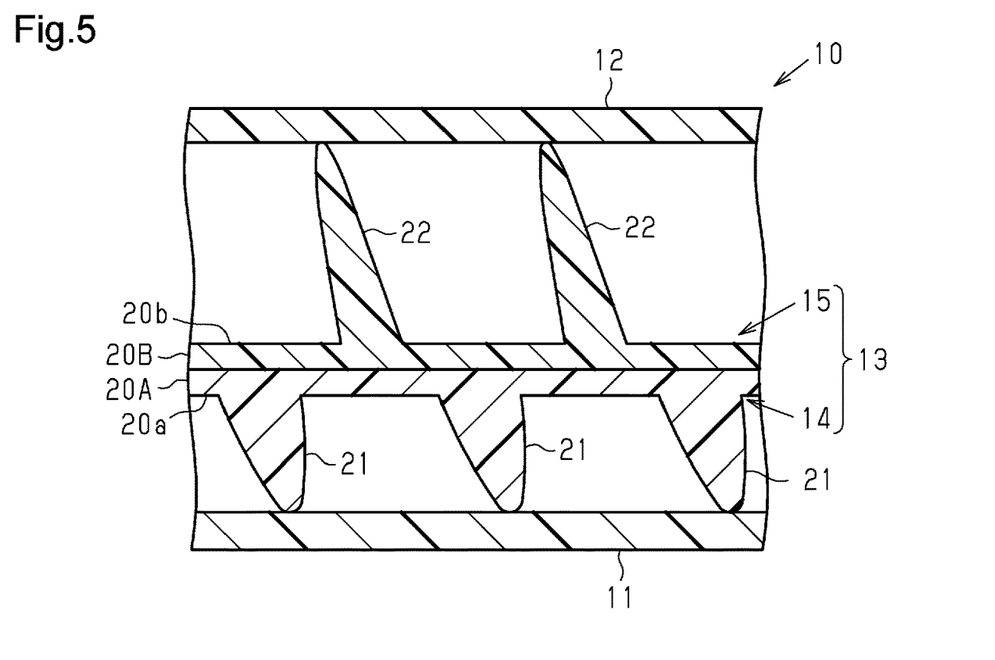
FIG. 5 is a cross-sectional view schematically showing a superposition interior component according to a third embodiment.

As shown in FIG. 5, a middle member 13 includes a first member 14 and a second member 15, which are provided separately. The first member 14 includes a plate-shaped body segment 20A and first protrusions 21, which protrude from a first surface 20a of the body segment 20A. The second member 15 includes a plate-shaped body segment 20B and second protrusions 22, which protrude from a second surface 20b of the body segment 20B.

The surface of the body segment 20A of the first member 14 opposite from the first surface 20a and the surface of the body segment 20B of the second member 15 opposite from the second surface 20b are in contact with each other.

The superposition interior component 10 according to the above-described present embodiment has the advantages (1), (2), and (4) of the first embodiment.

Fourth Embodiment

A fourth embodiment will now be described with reference to FIG. 6. Differences from the second embodiment will mainly be discussed. Thus, the same or corresponding components as those in the second embodiment are given the same reference numerals, and detailed explanations are omitted.

Figure 6:
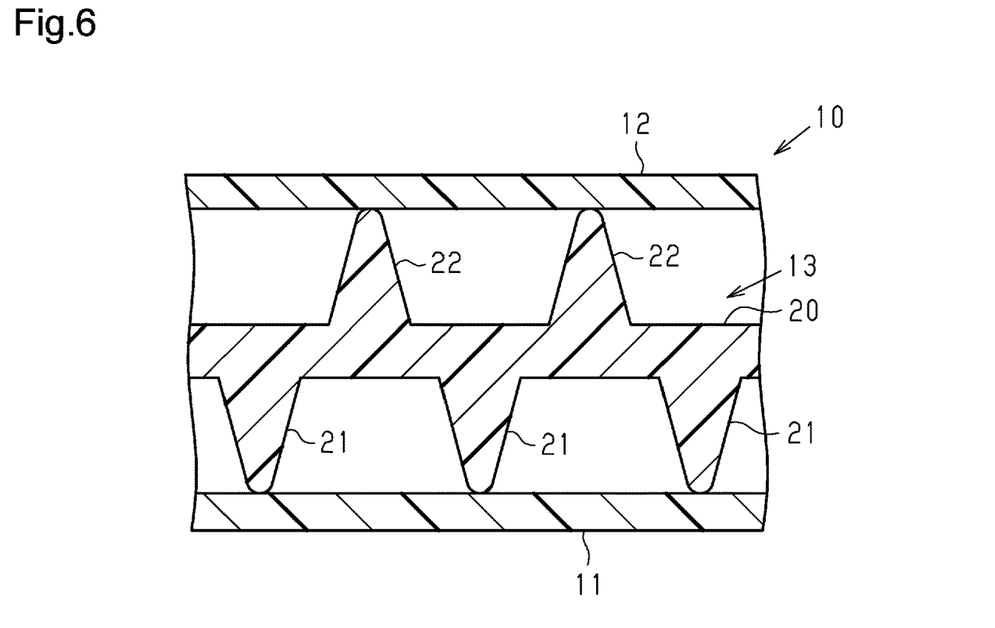
FIG. 6 is a cross-sectional view schematically showing a superposition interior component according to a fourth embodiment.

As shown in FIG. 6, the protruding direction of first protrusions 21 and the protruding direction of second protrusions 22 are both perpendicular to the body 20.

The superposition interior component according to the above-described present embodiment has the advantages (1), (3), and (4) of the first embodiment.

Fifth Embodiment

Figure 7A:
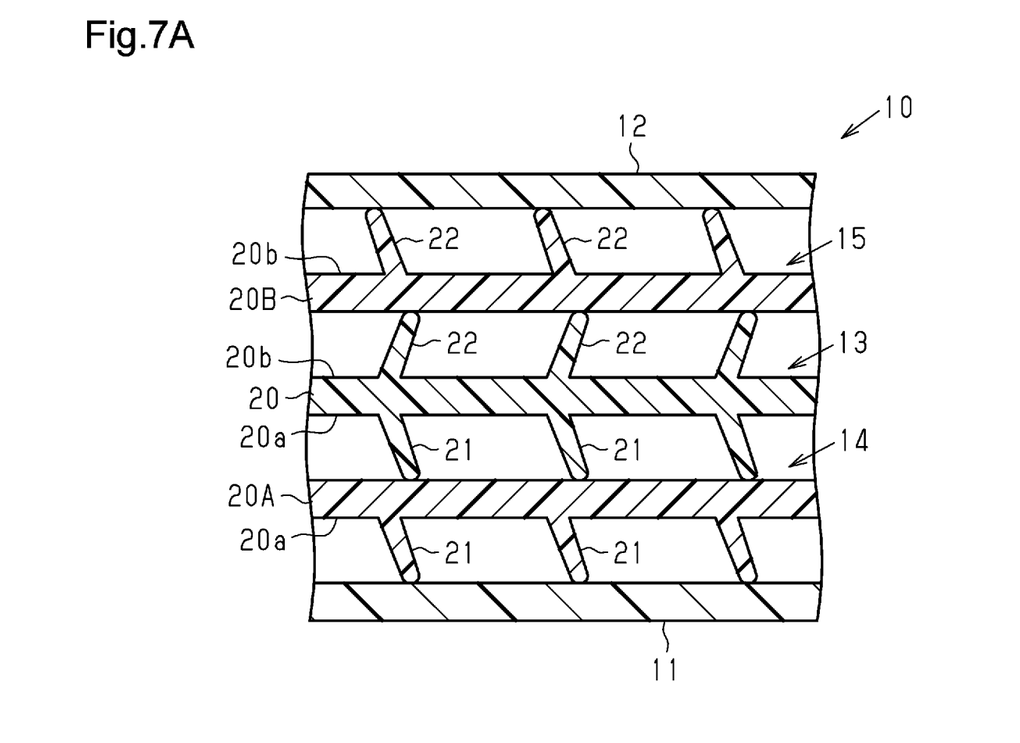
FIGS. 7A and 7B are cross-sectional views schematically showing a superposition interior component according to a fifth embodiment.
Figure 7B:
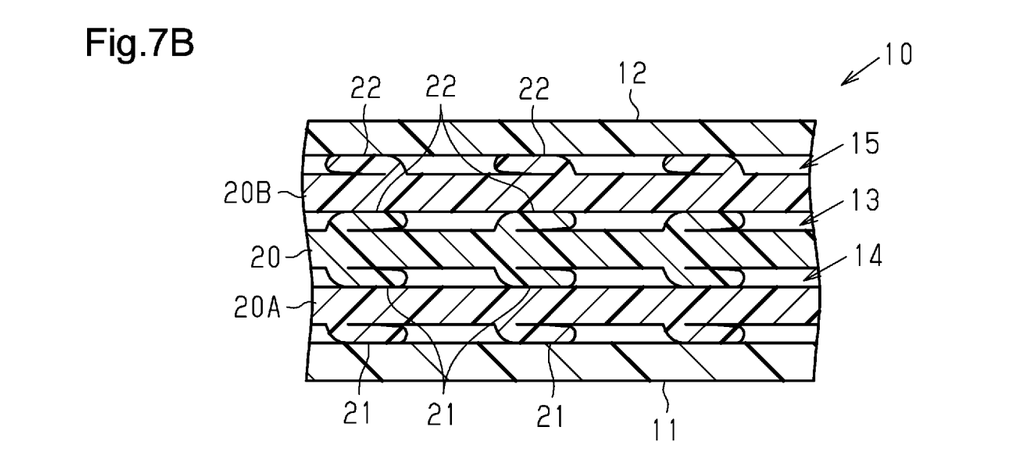
Figure 8:
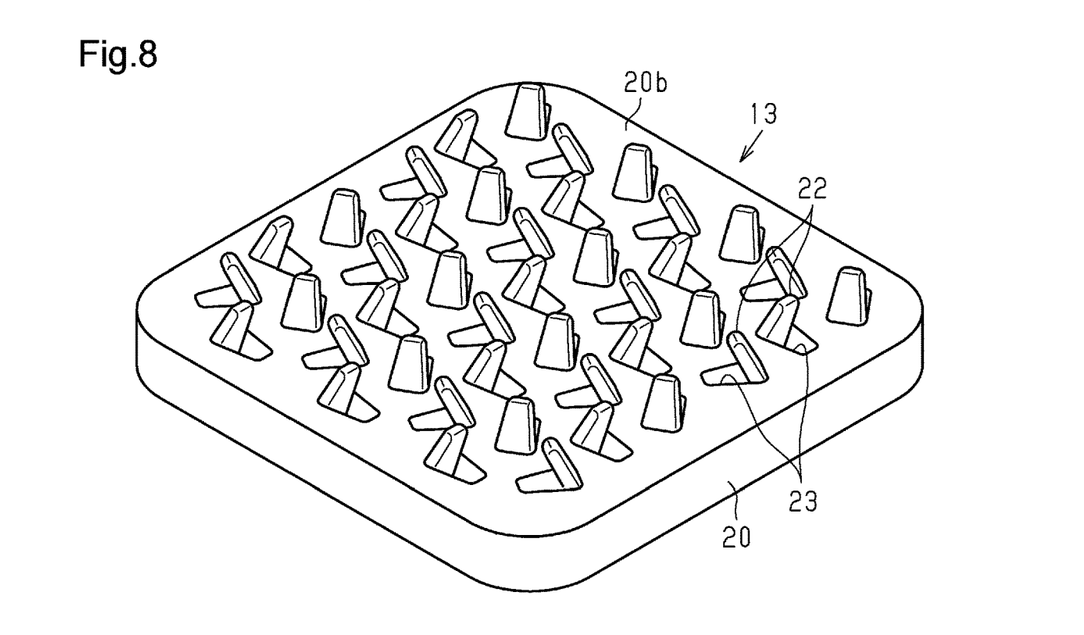
FIG. 8 is a perspective view showing a second surface of a middle member of a sixth embodiment.
Figure 9:
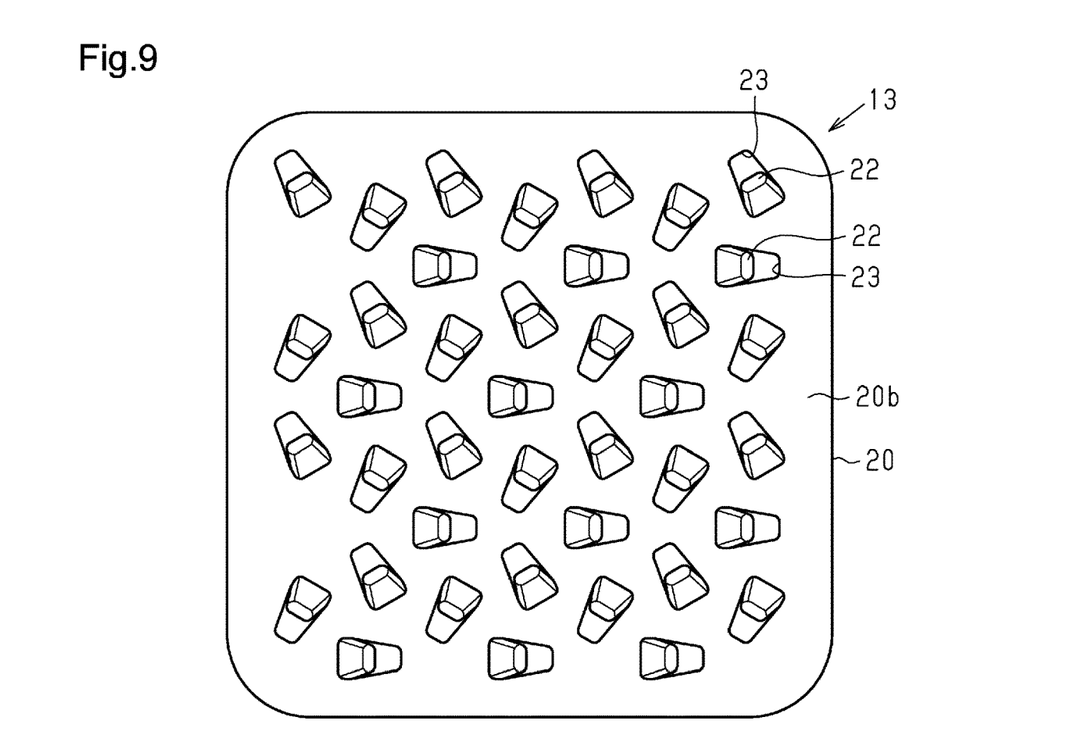
FIG. 9 is a plan view showing the second surface of the middle member of the sixth embodiment.

With reference to FIGS. 7A and 7B, differences between the fifth embodiment and the first embodiment will be mainly discussed. Thus, the same or corresponding components as those in the first embodiment are given the same reference numerals, and detailed explanations are omitted.

As shown in FIG. 7A, a first member 14 is disposed between a base 11 and a middle member 13. A second member 15 is disposed between an outer layer member 12 and the middle member 13.

The first member 14 and the second member 15 respectively have the same structures as the first member 14 and the second member 15 described in the third embodiment. That is, the first member 14 includes a plate-shaped body segment 20A and protrusions 21, which protrude from a first surface 20a of the body segment 20A, and the first surface 20a faces the base 11. The second member 15 includes a plate-shaped body segment 20B and protrusions 22, which protrude from a second surface 20b of the body segment 20B, and the second surface 20b faces the outer layer member 12.

The distal ends of the first protrusions 21 of the middle member 13 are in contact with the body segment 20A of the first member 14.

The distal ends of the second protrusions 22 of the middle member 13 are in contact with the body segment 20B of the second member 15.

The distal ends of the protrusions 21 of the first member 14 are in contact with the base 11.

The distal ends of the protrusions 22 of the second member 15 are in contact with the outer layer member 12.

An operation of the present embodiment will now be described.

When the outer layer member 12 is depressed toward the base 11 as shown in FIG. 7B, the protrusions 22 of the second member 15 are deformed to bend while being in contact with the outer layer member 12. At this time, the second member 15, which is displaced toward the base 11, depresses the middle member 13, so that the second protrusions 22 and the first protrusions 21 of the middle member 13 are deformed to bend. Further, the middle member 13, which is displaced toward the base 11, depresses the first member 14, so that the protrusions 21 of the first member 14 are deformed to bend while being in contact with the base 11.

The superposition interior component according to the above-described present embodiment has an advantage (5) in addition to the advantages (1) to (4) of the first embodiment.

(5) The present embodiment further increases the depressible amount of the superposition interior component 10.

Sixth Embodiment

With reference to FIGS. 8 to 10B, differences between the sixth embodiment and the first embodiment will be mainly discussed. Thus, the same or corresponding components as those in the first embodiment are given the same reference numerals, and detailed explanations are omitted.

Figure 10A:
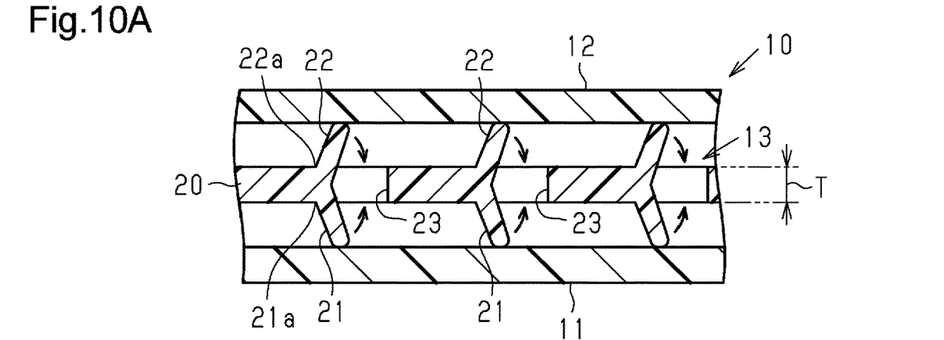
FIGS. 10A and 10B are cross-sectional views schematically showing a superposition interior component according to the sixth embodiment.

As shown in FIG. 10A, a middle member 13 includes multiple pairs of a first protrusion 21 and a second protrusion 22. A proximal end 21a of the first protrusion 21 and a proximal end 22a of the second protrusion 22 of each pair are disposed on the opposite sides of a body 20. More specifically, the first protrusion 21 and the second protrusion 22 of each pair are symmetrical with respect to an imaginary plane parallel with the body 20.

As shown in FIGS. 8 to 10A, the body 20 includes accommodation holes 23. Each accommodation hole 23 extends from the proximal ends 21a and 22a of the corresponding pair of the first protrusion 21 and the second protrusion 22. The protrusions 21, 22 are inclined in relation to the body 20 so as to approach the adjacent accommodation holes 23.

Figure 10B:
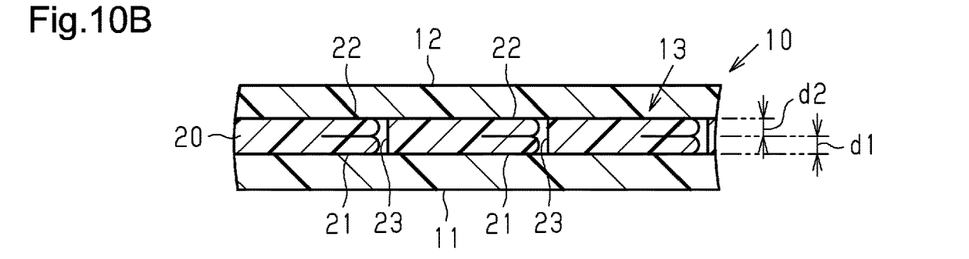

As shown in FIG. 10B, each accommodation hole 23 accommodates a first protrusion 21 and a second protrusion 22, which have been deformed to bend. The sum of the maximum value d1 of the cross-sectional size of each first protrusion 21 and the maximum value d2 of the cross-sectional size of each second protrusion 22 is set to be less than or equal to the thickness T of the body 20 (d1+d2≤T).

An operation of the present embodiment will now be described.

When the outer layer member 12 is depressed toward the base 11, the second protrusions 22 of the middle member 13 are deformed to bend while being in contact with the outer layer member 12 as shown in FIG. 10B. This causes each second protrusion 22 to be accommodated in the adjacent accommodation hole 23. At this time, the first protrusions 21 are deformed to bend while being in contact with the base 11. This causes each first protrusion 21 to be accommodated in the adjacent accommodation hole 23. That is, the first protrusion 21 and the second protrusion 22 of each pair are accommodated in the same accommodation hole 23 in a stacked state.

The superposition interior component according to the above-described present embodiment has the following advantage (6) in addition to the advantages (1) to (4) of the first embodiment.

(6) The present embodiment further increases the depressible amount of the superposition interior component 10.

Seventh Embodiment

Figure 11:
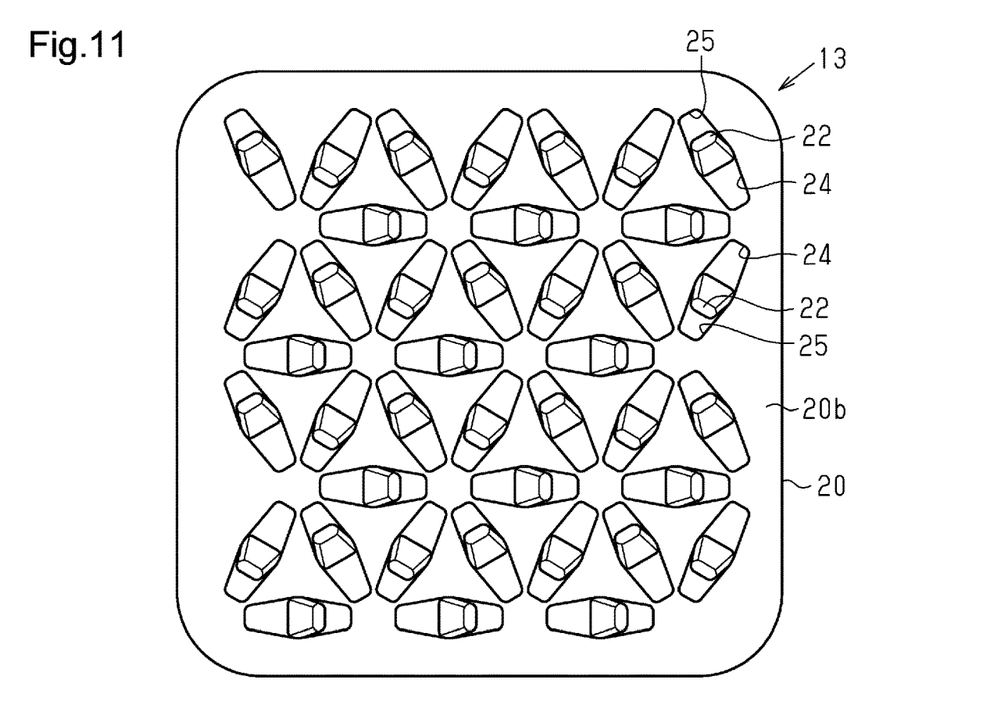
FIG. 11 is a plan view showing a second surface of a middle member of a seventh embodiment.
Figure 12A:
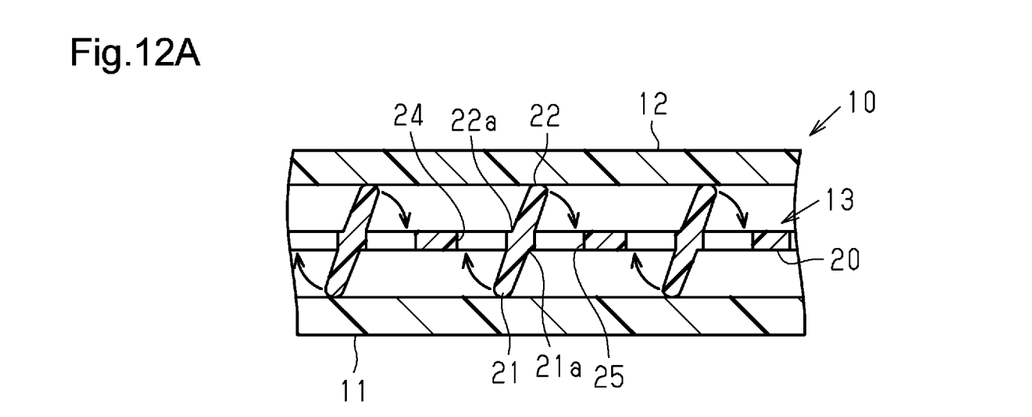
FIGS. 12A and 12B are cross-sectional views schematically showing a superposition interior component according to the seventh embodiment.
Figure 12B:
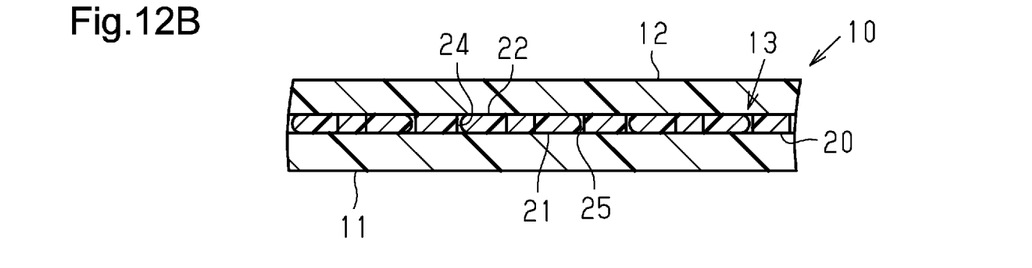
Figure 13:
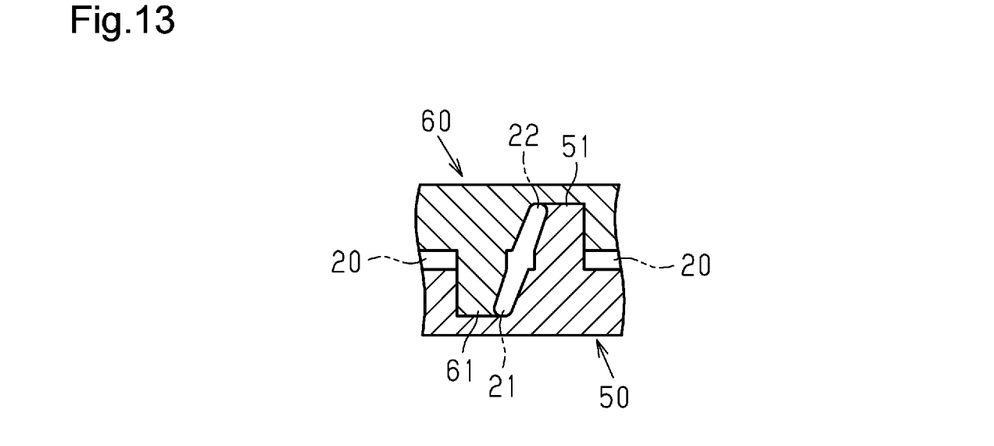
FIG. 13 is a cross-sectional view showing a molding apparatus for the middle member of the seventh embodiment.

With reference to FIGS. 11 to 13, differences between the seventh embodiment and the sixth embodiment will be mainly discussed. Thus, the same or corresponding components as those in the sixth embodiment are given the same reference numerals, and detailed explanations are omitted.

As shown in FIGS. 11 and 12A, a body 20 includes first accommodation holes 24 for accommodating first protrusions 21 and second accommodation holes 25 for accommodating second protrusions 22.

Each first accommodation hole 24 and each second accommodation hole 25 extend in opposite directions from the proximal ends 21a and 22a of the corresponding first protrusion 21 and the corresponding second protrusion 22. More specifically, each first protrusion 21 is inclined in relation to the body 20 so as to approach the corresponding first accommodation hole 24. Also, each second protrusion 22 is inclined in relation to the body 20 so as to approach the corresponding second accommodation hole 25.

An operation of the present embodiment will now be described.

When the outer layer member 12 is depressed toward the base 11, the second protrusions 22, which protrude from the body 20 of the middle member 13, are deformed to bend while being in contact with the outer layer member 12 as shown in FIG. 12B. This causes each second protrusion 22 to be accommodated in the adjacent second accommodation hole 25. At this time, the first protrusions 21, which protrude from the body 20, are deformed to bend while being in contact with the base 11. This causes each first protrusion 21 to be accommodated in the adjacent first accommodation hole 24. In this manner, the first protrusion 21 and the second protrusion 22 are accommodated in the different accommodation holes 24, 25.

The superposition interior component according to the above-described present embodiment has the following advantage (7) in addition to the advantages (1) to (4) of the first embodiment.

(7) It is not necessary to reduce the cross-sectional sizes of the first protrusions 21 and the second protrusions 22. This allows the required durability of the protrusions 21 and 22 to be ensured easily.

The above-described configuration aligns the protruding direction of each first protrusion 21 and the protruding direction of the corresponding second protrusion 22 with each other as shown in FIG. 12A. Accordingly, when the middle member 13 is molded using a first mold half 50 and a second mold half 60 as shown in FIG. 13, a projection 51 of the first mold half 50 forms a surface of the first protrusion 21 that faces the second accommodation hole 25, the second accommodation hole 25, and a surface of the second protrusion 22 that faces the second accommodation hole 25. Also, a projection 61 of the second mold half 60 forms a surface of the first protrusion 21 that faces the first accommodation hole 24, the first accommodation hole 24, and a surface of the second protrusion 22 that faces the first accommodation hole 24. The use of the first mold half 50 and the second mold half 60 suppresses the formation of undercuts and allows the middle member 13 to be molded easily.

Eighth Embodiment

Figure 14:
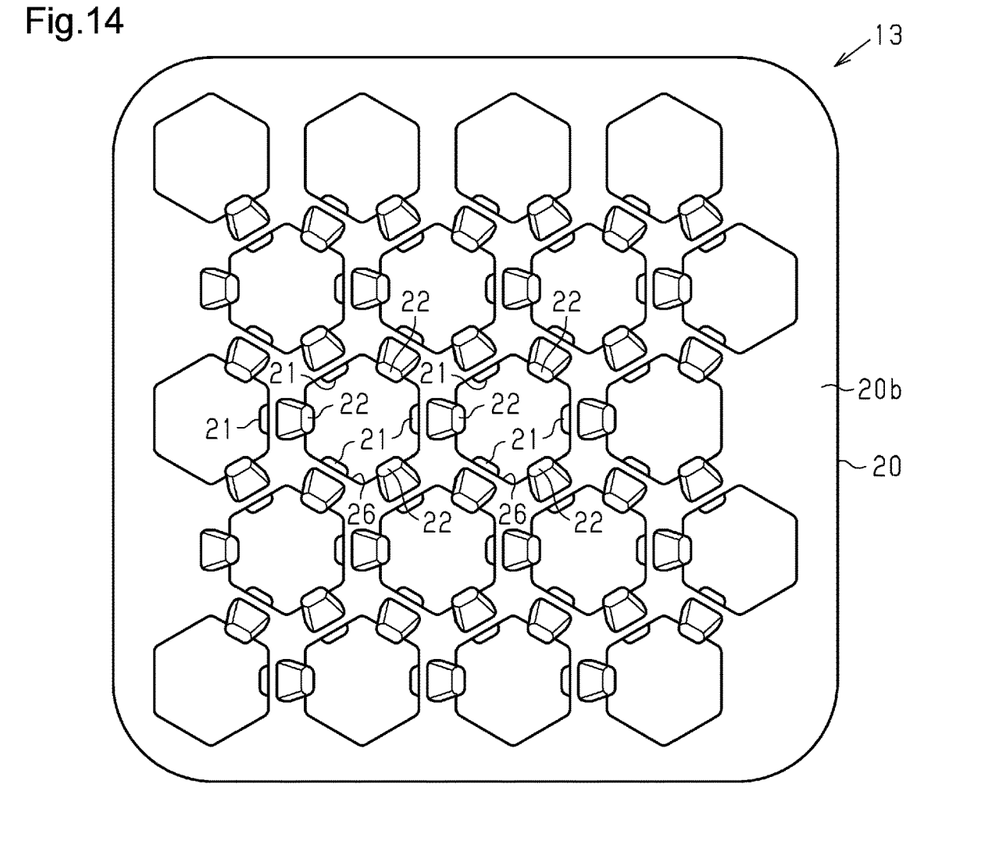
FIG. 14 is a plan view showing a second surface of a middle member of an eighth embodiment.
Figures 15A, 15B:
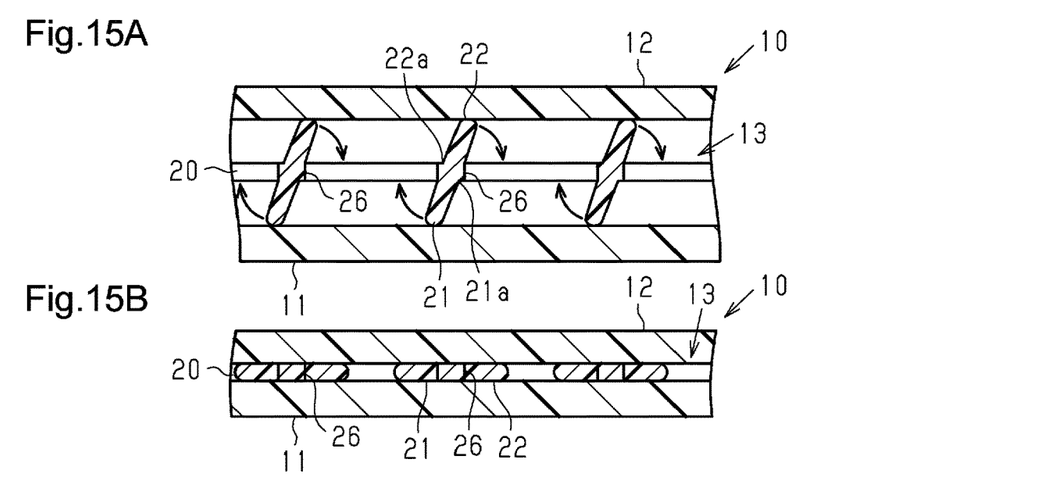
FIGS. 15A and 15B are cross-sectional views schematically showing a superposition interior component according to the eighth embodiment.

With reference to FIGS. 14, 15A, and 15B, differences between the eighth embodiment and the seventh embodiment will be mainly discussed. Thus, the same or corresponding components as those in the seventh embodiment are given the same reference numerals, and detailed explanations are omitted.

As shown in FIG. 14, a body 20 includes multiple accommodation holes 26 having a regular hexagonal shape in a plan view. The accommodation holes 26 are arranged such that the adjacent sides of every adjacent two of the accommodation holes 26 are parallel with each other, and distances between the accommodation holes 26 are constant.

As shown in FIG. 15A, a pair of a first protrusion 21 and a second protrusion 22 is provided between every adjacent two of the accommodation holes 26 in the body 20. The proximal ends 21a and 22a of the first protrusion 21 and the second protrusion 22 are provided with a section of the body 20 in between. The first protrusion 21 and the second protrusion 22 of each pair are respectively accommodated in adjacent two of the accommodation holes 26.

As shown in FIG. 14, a pair of a first protrusion 21 and a second protrusion 22 corresponds to each side of each accommodation hole 26. That is, six pairs of a first protrusion 21 and a second protrusion 22 are provided around each accommodation hole 26.

More specifically, on the second surface 20b of the body 20, three second protrusions 22 are provided on three of the six sides (every other side of the six sides) of each accommodation hole 26. These three second protrusions 22 are inclined in relation to the body 20 so as to approach the accommodation hole 26, and are accommodated in the accommodation hole 26.

On the first surface 20a of the body 20, three first protrusions 21 are provided on the three of the six sides of each accommodation hole 26 on which the second protrusions 22 are not provided. These three first protrusions 21 are inclined in relation to the body 20 so as to approach the accommodation hole 26, and are accommodated in the accommodation hole 26.

An operation of the present embodiment will now be described.

When the outer layer member 12 is depressed toward the base 11, the first protrusion 21 and the second protrusion 22 in each pair are accommodated in different ones of the accommodation holes 26 as shown in FIGS. 15A and 15B.

The superposition interior component according to the above-described present embodiment has the following advantage (8) in addition to the advantages (1) to (4) of the first embodiment and the advantage (7) of the seventh embodiment.

(8) The distances between the accommodation holes 26 are constant. The thickness of the mold for forming the middle member 13 is prevented from being reduced locally. This reliably ensures the strength of the mold.

Ninth Embodiment

With reference to FIGS. 16A to 16C, and 17, the differences between the ninth embodiment and the second embodiment will be mainly discussed. Thus, the same or corresponding components as those in the second embodiment are given the same reference numerals, and detailed explanations are omitted.

Figure 16A:
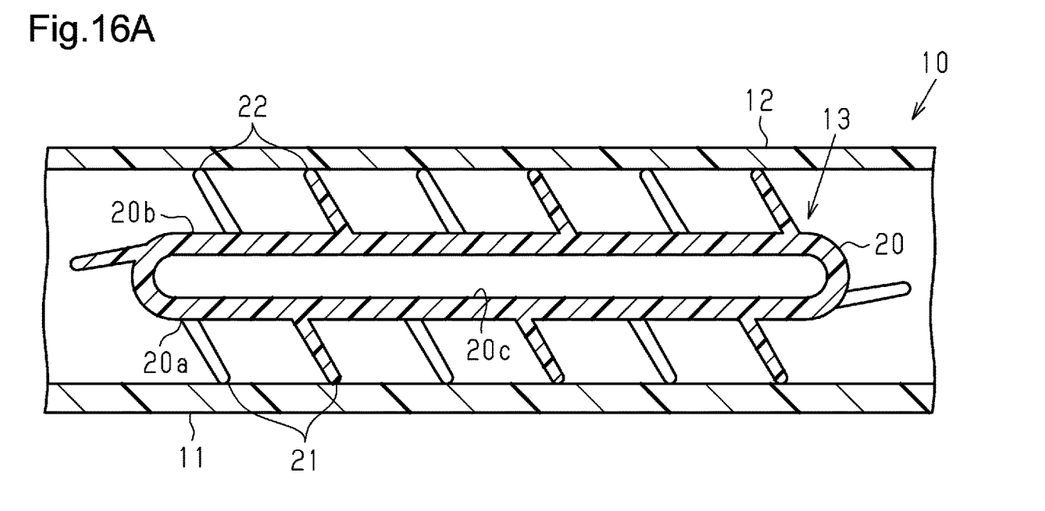
FIGS. 16A to 16C are cross-sectional views schematically showing a superposition interior component according to a ninth embodiment.

As shown in FIG. 16A, a middle member 13 is held between a base 11 and an outer layer member 12. In this state, the body 20 is shaped as a hollow plate.

Figure 17:
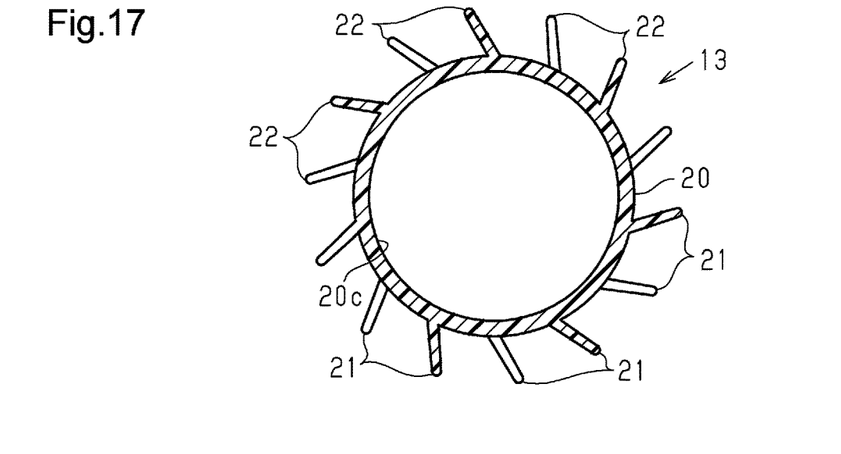
FIG. 17 is a cross-sectional view showing a middle member of the ninth embodiment.

As shown in FIG. 17, the body 20 is cylindrical when in a natural state, in which the body 20 is not held between the base 11 and the outer layer member 12 and not receiving an external force. The body 20 includes protrusions 21, 22 on the outer circumferential surface. The protrusions 21, 22 are separated from each other in the circumferential direction and the axial direction of the body 20.

When the middle member 13 is held between the base 11 and the outer layer member 12 as shown in FIG. 16A, ones of the protrusions 21, 22 that are located on a first surface 20a of the body 20, which faces the base 11, serve as first protrusions 21, and the ones that are located on a second surface 20b of the body 20, which faces the outer layer member 12, serve as second protrusions 22.

An operation of the present embodiment will now be described.

Figure 16B:
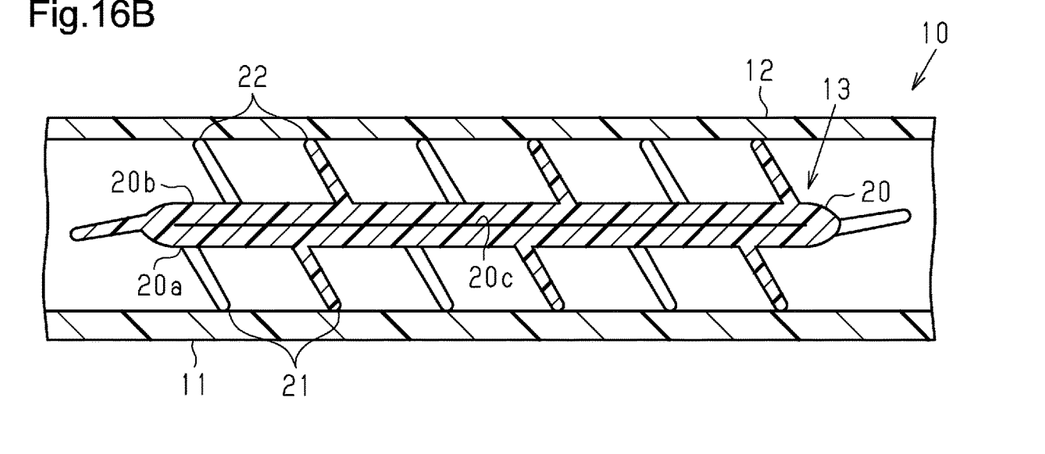

When the outer layer member 12 is depressed toward the base 11, a hollow portion 20c of the body 20 collapses as shown in FIG. 16B.

Figure 16C:
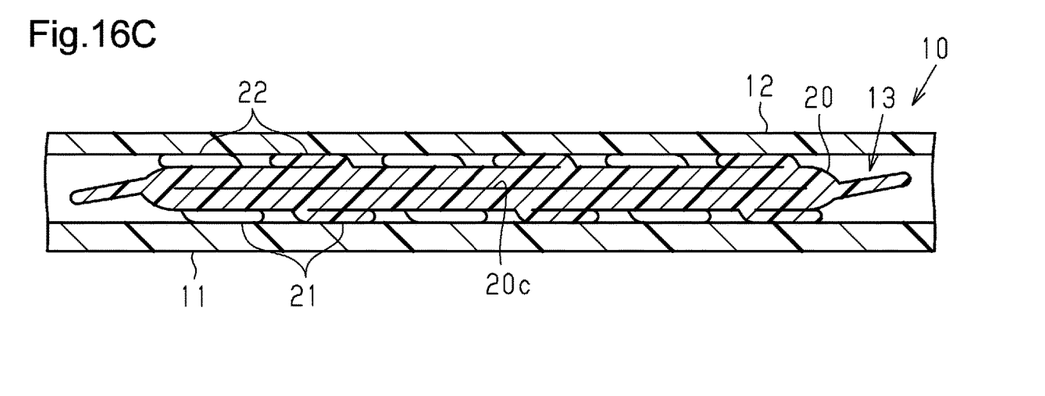

When the outer layer member 12 is depressed further toward the base 11, the first protrusions 21 and the second protrusions 22, which protrude from the body 20, are deformed to bend as shown in FIG. 16C.

The superposition interior component according to the above-described present embodiment has the following advantage (9) in addition to the advantages (1) to (4) of the first embodiment.

(9) Since the body 20 is shaped as a hollow plate, the body 20 itself can be deformed in the thickness direction in addition to the first protrusions 21 and the second protrusions 22. Thus, the present embodiment further increases the depressible amount of the superposition interior component 10.

Tenth Embodiment

With reference to FIGS. 18 to 20C, differences between the tenth embodiment and the first embodiment will be mainly discussed. Thus, the same or corresponding components as those in the first embodiment are given the same reference numerals, and detailed explanations are omitted.

Figure 18:
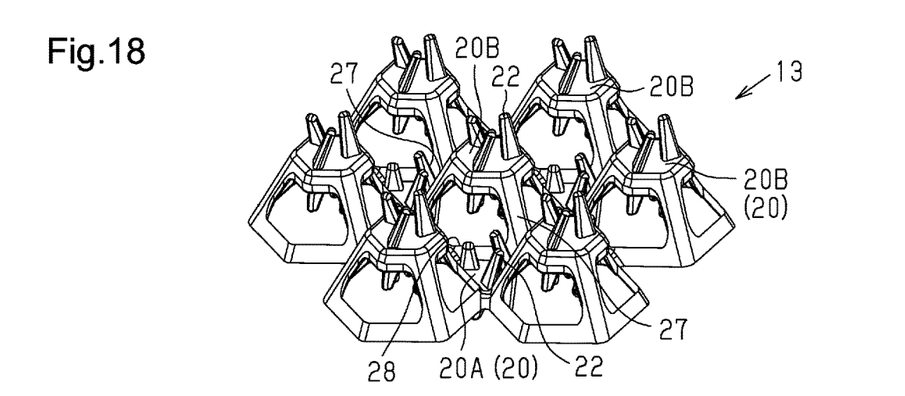
FIG. 18 is a perspective view showing a second surface of a middle member of a tenth embodiment.
Figure 19:
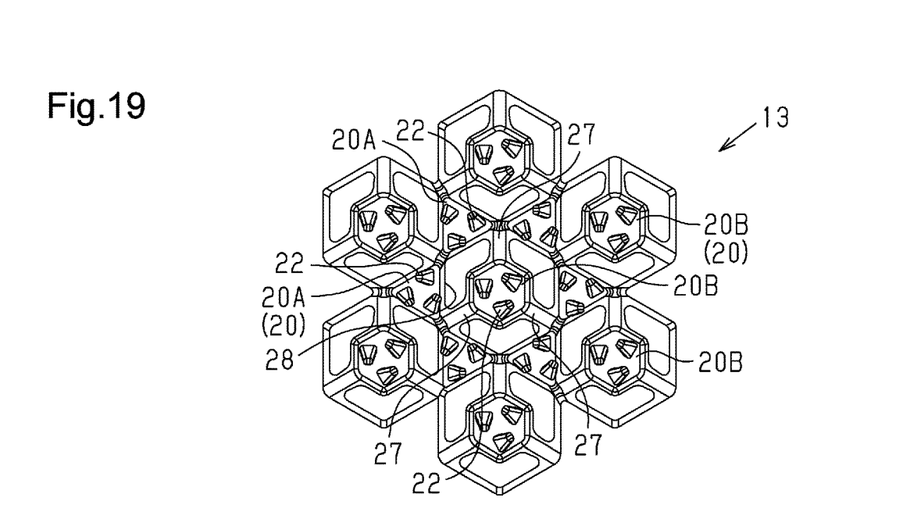
FIG. 19 is a plan view showing the second surface of the middle member of the tenth embodiment.

As shown in FIGS. 18 and 19, a body 20 includes plate-shaped first body segments 20A and plate-shaped second body segments 20B. The first body segments 20A are arranged in a plane in the body 20 while being separated from each other, and the second body segments 20B are arranged in a plane in the body 20 while being separated from each other.

Each first body segment 20A substantially has the shape of a regular triangle in a plan view.

Each second body segment 20B substantially has the shape of a regular hexagon in a plan view.

Figure 20A:
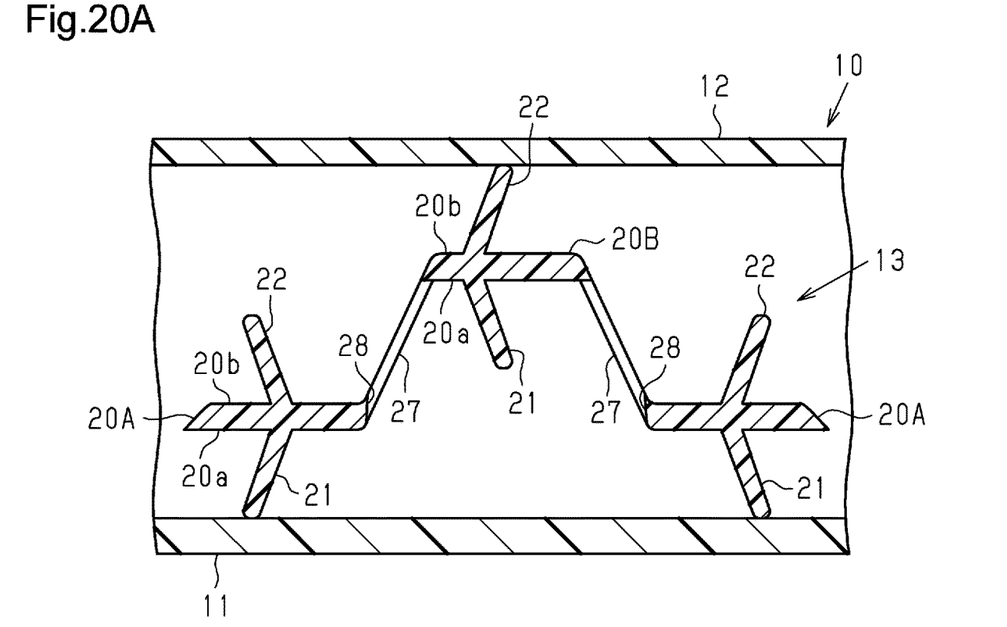
FIGS. 20A to 20C are cross-sectional views schematically showing a superposition interior component of the middle member of the tenth embodiment.

As shown in FIG. 20A, the second body segment 20B are each located among the corresponding first body segments 20A and are closer to the outer layer member 12 than the first body segments 20A.

As shown in FIGS. 18 to 20C, a middle member 13 includes coupling portions 27, which couple the first body segments 20A and the second body segments 20B to each other.

More specifically, the coupling portions 27 extend outward and toward the base 11 from three (every other apex) of the six apexes of each second body segment 20B. Two of the first body segments 20A are disposed between every adjacent two of the coupling portions 27. These two first body segments 20A are coupled to the coupling portions 27 with apexes opposed to each other.

A lightening portion 28 is formed between every adjacent two of the coupling portions 27 and between the two first body segments 20A located between these coupling portions 27. The coupling portions 27 are thinner and thus weaker than the first body segments 20A, the second body segments 20B, the first protrusions 21, and the second protrusions 22.

As shown in FIG. 20A, each first body segment 20A includes a first protrusion 21 on a first surface 20a, which faces the base 11, and second protrusion 22 on a second surface 20b, which faces the outer layer member 12. Each second body segment 20B includes a first protrusion 21 on a first surface 20a, which faces the base 11, and second protrusion 22 on a second surface 20b, which faces the outer layer member 12.

An operation of the present embodiment will now be described.

Figure 20B:
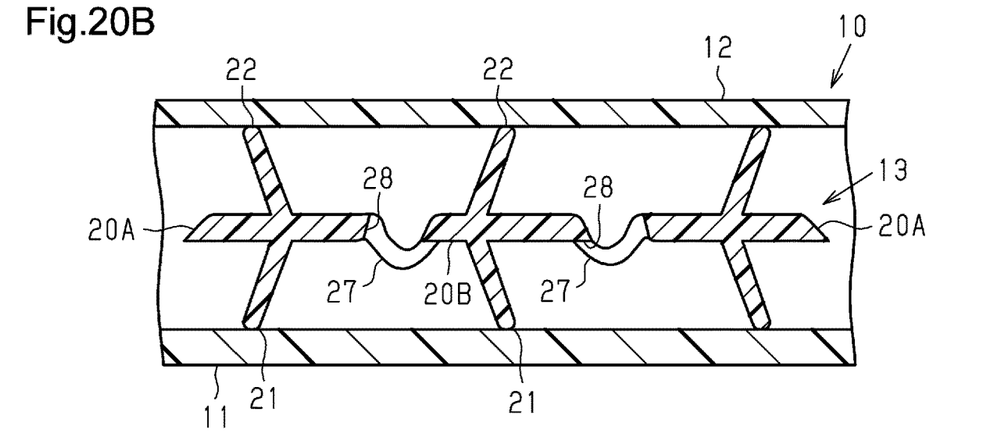

When the outer layer member 12 is depressed toward the base 11, the second protrusions 22, which protrude from the second body segments 20B of the middle member 13, are brought into contact with the outer layer member 12 as shown in FIG. 20B. At this time, the coupling portions 27 are deformed to bend prior to the first body segments 20A, the second body segments 20B, the first protrusions 21, and the second protrusions 22. Accordingly, the second body segments 20B are displaced to the same position as the first body segments 20A. Then, the second protrusions 22 of the first body segments 20A are brought into contact with the outer layer member 12, and the first protrusions 21 of the second body segments 20B are brought into contact with the base 11.

Figure 20C:
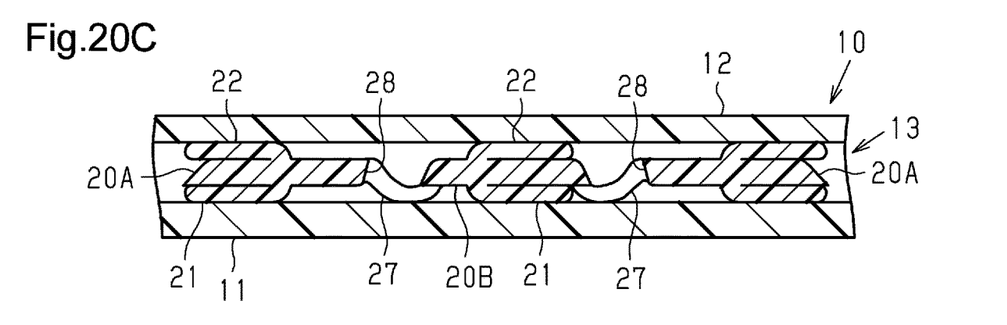

When the outer layer member 12 is depressed further toward the base 11 as shown in FIG. 20C, the protrusions 21 and 22 of the first body segments 20A and the second body segments 20B are deformed to bend while being in contact with the base 11 and the outer layer member 12.

The superposition interior component according to the above-described present embodiment has the following advantage (10) in addition to the advantages (1) to (4) of the first embodiment.

(10) The coupling portions 27 can be deformed in the thickness direction in addition to the first protrusions 21 and the second protrusions 22. Thus, the present embodiment further increases the depressible amount of the superposition interior component 10.

<Modifications>

The above-described embodiments may be modified as follows. The above-described embodiments and the following modifications can be combined as long as the combined modifications remain technically consistent with each other.

The material of the outer layer member 12 may be changed to other materials. The material may be a woven fabric or a soft plastic other than soft polyvinyl chloride. The soft plastic includes as an elastomer (Shore hardness in a range approximately from 30 D to 40 D).

The material of the middle member 13 may be changed to other materials. The material may be a soft plastic other than soft polyvinyl chloride. The soft plastic includes a polyester-based elastomer.

The arrangement pattern of the first protrusions 21 and the second protrusions 22 may be changed.

The shapes and the sizes of the first protrusions 21 and the second protrusions 22 may be changed. For example, the first protrusions 21 may be longer and have a smaller cross-sectional size than the second protrusions 22.

The inclination angle of the protruding direction of the first protrusions 21 in relation to the normal line O may be different from the inclination angle of the protruding direction of the second protrusions 22 in relation to the normal line O.

The above-described embodiments describe structures in which the distal end of each first protrusion is in contact with the base 11, and the distal end of each second protrusion is in contact with the outer layer member 12. However, the present invention is not limited to this. For example, a structure may be employed in which the distal ends of some or all of the first protrusions are not in contact with a base. Also, a structure may be employed in which some or all of the second protrusions are not in contact with an outer layer member.

The sixth to eighth embodiments describe structures in which the protrusions 21, 22 are entirely accommodated in the accommodation holes 23, 24, 25, 26. However, the protrusions 21, 22 may be partly accommodated in accommodation holes.

The shape of the accommodation holes 26 in the eighth embodiment is not limited to a regular hexagon in a plan view, but may be a quadrilateral in a front view.

The tenth embodiment describes the structure in which the coupling portions 27 are weaker than the first body segments 20A, the second body segments 20B, the first protrusions 21, and the second protrusions 22. However, the present invention is not limited to this. For example, a structure may be employed in which the first protrusions 21 and the second protrusions 22 are deformed prior to the coupling portions 27.

The superposition interior components according to the present invention are not limited to door trims, but may be used for other interior components of a vehicle, such as an instrument panel and a glove compartment.

DESCRIPTION OF THE REFERENCE NUMERALS

10 . . . Interior Component; 11 . . . Base; 12 . . . Outer Layer Member; 13 . . . Middle Member; 14 . . . First Member; 15 . . . Second Member; 20 . . . Body; 20A . . . First Body Segment; 20B . . . Second Body Segment; 20a . . . First Surface; 20b . . . Second Surface; 20c . . . Hollow Portion; 21 . . . First Protrusion; 22 . . . Second Protrusion; 23, 26 . . . Accommodation Holes; 24 . . . First Accommodation Hole; 25 . . . Second Accommodation Hole; 27 . . . Coupling Portion; 28 . . . Lightening Portion

The invention claimed is:

1. A superposition interior component, comprising:
a base;
an outer layer member that covers the base; and
a middle member made of a soft plastic, the middle member being disposed between the base and the outer layer member, wherein
the base, the middle member, and the outer layer member are stacked together to form the superposition interior component,
the middle member includes:
a plate-shaped body;
first protrusions that protrude from a first surface of the body, the first surface facing the base; and
second protrusions that protrude from a second surface of the body, the second surface facing the outer layer member,
protruding directions of the first protrusions and the second protrusions are inclined in relation to a line normal of the body,
the second protrusions include sets of three second protrusions located close to one another,
proximal portions of the second protrusions in each set are arranged at positions corresponding to apexes of a regular triangle, and
the three second protrusions project in different directions and are separated from one another.

2. The superposition interior component according to claim 1, wherein the body, the first protrusions, and the second protrusions are molded integrally.

3. A superposition interior component, comprising:
a base;
an outer layer member that covers the base; and
a middle member made of a soft plastic, the middle member being disposed between the base and the outer layer member, wherein
the base, the middle member, and the outer layer member are stacked together to form the superposition interior component, and
the middle member includes:
a plate-shaped body;
first protrusions that protrude from a first surface of the body, the first surface facing the base; and
second protrusions that protrude from a second surface of the body, the second surface facing the outer layer member,
the body includes accommodation holes, and
the accommodation holes are configured to accommodate at least one of the first protrusions or the second protrusions.

4. The superposition interior component according to claim 3, wherein
a proximal end of each first protrusion and a proximal end of each second protrusion are disposed on opposite sides of the body, and
each first protrusion and each respective second protrusion are configured to be accommodated in a same one of the accommodation holes.

5. The superposition interior component according to claim 3, wherein
a proximal end of each first protrusion and a proximal end of each second protrusion are disposed on opposite sides of the body, and
each first protrusion and each respective second protrusion are configured to be accommodated in different ones of the accommodation holes.

6. The superposition interior component according to claim 1, wherein the body is shaped as a hollow plate.

7. A superposition interior component, comprising:
a base;
an outer layer member that covers the base; and
a middle member made of a soft plastic, the middle member being disposed between the base and the outer layer member, wherein
the base, the middle member, and the outer layer member are stacked together to form the superposition interior component, and
the middle member includes:
a plate-shaped body;
first protrusions that protrude from a first surface of the body, the first surface facing the base; and
second protrusions that protrude from a second surface of the body, the second surface facing the outer layer member,
the body includes:
first body segments that are arranged in a plane in the body while being separated from each other; and second body segments that are arranged in an other plane in the body while being separated from each other, the second body segments are each located among corresponding ones of the first body segments and are closer to the outer layer member than the first body segments, and the middle member includes coupling portions that couple the first body segments and the second body segments to each other, and the coupling portions are weaker than the first body segments, the second body segments, the first protrusions, and the second protrusions.

\* \* \* \* \*